United States Patent

Van Derbeck

[15] 3,704,590

[45] Dec. 5, 1972

[54] VAPOR GENERATING MANIFOLD AND CONTROL SYSTEM

[72] Inventor: John O. Van Derbeck, P.O. Box 644, Huntington Beach, Calif. 92648

[22] Filed: Nov. 17, 1969

[21] Appl. No.: 877,202

[52] U.S. Cl. ............................................60/108, 60/1
[51] Int. Cl. ..........................F01k 11/00, F01k 11/02
[58] Field of Search............60/1, 24, 25, 27, 33, 106, 60/107, 105, 108; 122/356

[56] References Cited

UNITED STATES PATENTS

| | | | |
|---|---|---|---|
| 2,395,984 | 3/1946 | Bartholomew | 60/34 |
| 2,429,035 | 10/1947 | Steving, Jr. | 60/106 |
| 2,618,923 | 11/1952 | Koopmans | 60/24 |
| 2,685,173 | 8/1954 | Percival | 60/24 X |
| 3,216,190 | 11/1965 | Baker | 60/24 |
| 3,353,349 | 11/1967 | Percival | 60/24 X |
| 3,527,049 | 9/1970 | Bush | 60/24 |
| 3,240,204 | 3/1966 | Wiesenthal | 122/356 X |
| 3,276,436 | 10/1966 | Guerrieri | 122/356 |
| 3,399,117 | 8/1968 | Fleischer | 122/356 X |

FOREIGN PATENTS OR APPLICATIONS

| | | | |
|---|---|---|---|
| 1,490 | 1/1900 | Great Britain | 60/24 |
| 617,649 | 8/1935 | Germany | 60/27 |

Primary Examiner—Martin P. Schwadron
Assistant Examiner—A. M. Ostrager

[57] ABSTRACT

A novel vapor generating manifold is employed in combination with a vapor engine. Exhaust from the engine is recycled in a closed Rankine cycle system. The vapor generating manifold includes a narrow arc-shaped passageway with burners on both sides of the passageway. The entire structure is so designed as to constitute a substantially composite structure thus enhancing its desirability. The narrow arc-shaped passageway of the vapor generating manifold allows the manifold to be quickly and efficiently heated to thereby facilitate its vaporizing function.

1 Claim, 2 Drawing Figures

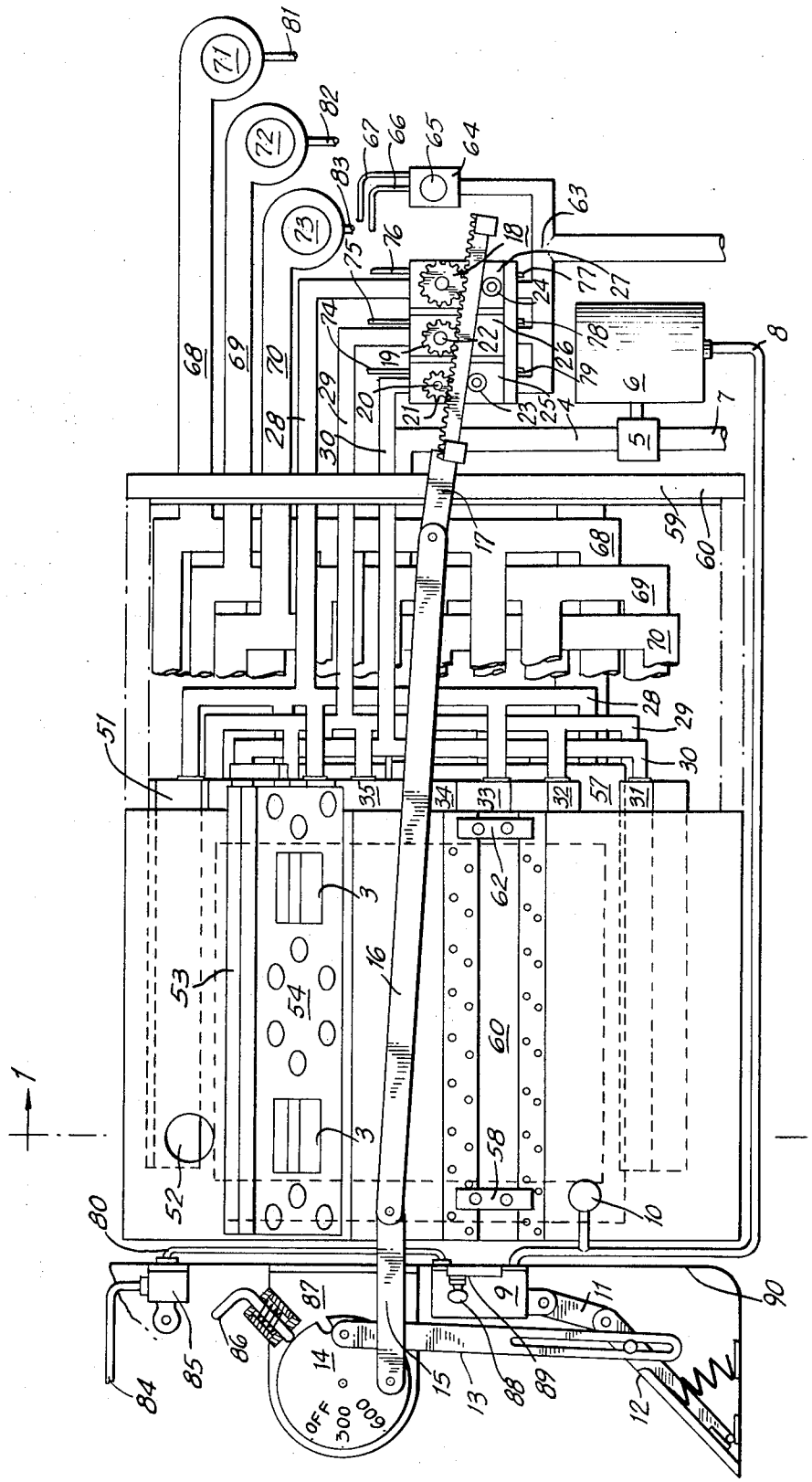

VAPOR GENERATING MANIFOLD AND CONTROL SYSTEM

BACKGROUND OF THE INVENTION

In recent years the undersirability of internal combustion engines has become more apparent with the growing concern of environmental pollution. Rankine cycle engines offer a solution to the pollution problem in that the working fluid can be recycled as opposed to being exhausted into the atmosphere. Though Rankine cycle power plants are well known in the art, heretofore their design and construction have not been particularly adaptable for use in automobiles. More particularly, their construction has been very cumbersome and requiring relatively a long start-up period.

SUMMARY OF THE INVENTION

The present invention is concerned with providing a novel means for generating vapor in a Rankine cycle power plant. In accordance with this invention a novel vapor generating manifold is employed in which a narrow arc-like, curved liquid-vapor passageway is used. Burners are placed on both sides of the passageway for supplying heat to vaporize the fluid supplied thereto. As will be discussed later, this construction provides a compact and composite vapor generating manifold. Additionally, this construction allows for the manifold to be quickly and efficiently heated, thereby reducing the start-up time and increasing the efficiency of the system.

Other features, objects, and advantages of the invention will be more apparent as the description proceeds.

In the drawing:

FIG. 2 is an engine-side view of the manifold illustrating the cooperating control systems for the engine and vapor generating manifold.

Figure 1:
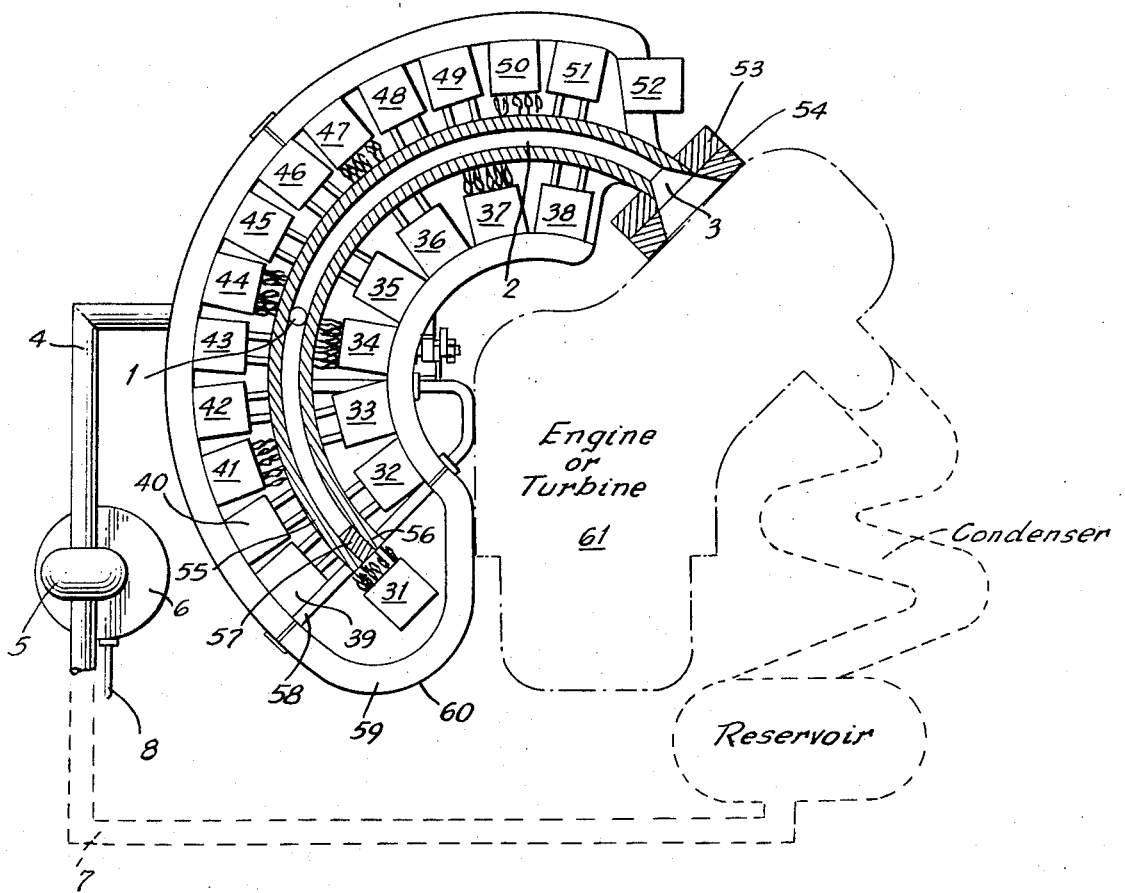
FIG. 1 is a view along section 1—1 of FIG. 2.

Turning now more specifically to FIG. 1. The overall operation of the system is that of a conventional Rankine cycle power plant. As shown in FIG. 1, exhaust from the prime mover, shown at 61, is led to a condenser to be liquefied and then to a reservoir. Liquid motive fluid is then pumped from the reservoir to the vapor generating manifold, (shown in the non-phantom lines of FIG. 1) whereby the motive fluid is vaporized and led to the prime mover or engine. The engine or prime mover shown by phantom lines at 61 is a reciprocating type of V-block design with one bank of cylinders removed. This is appropriate, as a vapor-powered engine should have twice as many power strokes as a comparable internal-combustion engine; therefore half as many cylinders can be made to produce the same smooth overlapping of power strokes.

Pump 5 delivers working fluid via conduits 7 and 4 from the reservoir to the vapor generating manifold, shown at 6. Element 8 represents electrical conductors which are energized by the motor-speed controller 9 (FIG. 2).

Working fluid enters the vapor generating manifold through liquid inlet port, 1. The manifold consists of an arc-shaped passageway 2 formed by semicircular walls 55 and 56. One end of the passageway is closed by a closure member 57. At the opposite end of the passageway is the outlet 3 for delivering vaporized working fluid to the prime mover. A mounting flange 53 is provided with a separate adapted plate for mounting to engines of different sizes and shapes. These parts may be suitably welded into place to provide fluid tight fittings. Both sides of the passageway 2 are provided with burners 31-51 which supply heat to the passageway. The passageway, itself is supported within the manifold by any suitable means such as a support columns 58 and 62 (see also FIG. 2). The burner area about the manifold is completely enclosed by removable jacket panels, for example 60, to which insulation panels are affixed. Further, provided is a hot-gas exhaust duct at 52.

The overall operation of the system is believed to be substantially self-evident from FIG. 1. Liquid is injected into the passageway 2 via inlet port 1. The passageway is well heated because of its narrowness and the intimate relationship of the burners with the passageway. As the fluid passes from the inlet port 1 to the outlet at 3 it is vaporized and therefore a high pressure vaporized working fluid is delivered to the engine or turbine, 61. The recirculation of the exhaust is done in a well known manner. As is conventionally done in Rankine cycle power plants, the exhaust is condensed and pumped back to the manifold. The large radius design of the manifold permits efficient passage of the vapor into the engine or turbine, and eliminates the friction of a conventional piping system and throttle valve between a boiler and steam engine.

Now turning attention to FIG. 2. As noted previously, conduits 7 and 4 are shown with pump 5. Thermally operated contacts, shown at 10, allow a complete circuit to be operatively established between the controller 9 and the variable speed motor 6. The controller 9 is operated by suitable linkage 11 which in turn, is connected to a spring biased pedal 12. The pedal 12 could be, by way of example, an automobile accelerator pedal.

Motor speed controller 9 is supplied with primary electrical power through conductors 80 from a key-operated switch 85 fed through conductors 84 from a high voltage converter (not shown). The speed controller 9 is adjustably mounted on compartment wall 90 in slider 89 and set by screw 88 to afford the option of either a dead-stop engine condition or an engine idle speed adjustment when the accelerator pedal is released and linkage 11 is thus moved to its highest position.

Co-operating slotted linkage 13 prevents the accelerator from being depressed if the temperature control dial 14 is turned to the "off" position, where it is automatically latched when spring and gravity pressures move manual release 86 into the notch in the dial. Releasing 86 and turning the dial toward temperature settings allows the accelerator some free movement within which to control the pumping rate of the pump 5 proportional to the temperature setting. Notice Noticeably increased pedal pressure will be required to simultaneously raise the temperature setting when a faster pumping rate is demanded.

No pumping can occur until minimum operating temperatures have been reached and thermally-actuated contacts at 10 have been closed; and if, during operation, the pumping speed should accidentally exceed the vapor generating rate, the cooling effect of the vaporizing liquid accumulating at the lower side of the manifold would open contacts 10 to prevent additional liquid from being pumped into the manifold until minimum generating temperature is again attained. Under normal operating conditions, however, the large amount of heat available and the main temperature control system will prevent manifold temperatures from dropping to the point where 10 would make an emergency cut-out.

The main temperature control system is a plurality of thermostatically controlled valves 25, 26 and 27; their thermostat settings actuated by dial 14, through linkages 15 and 16 to toothed rack 17, engaging gear of different sizes 18, 19 and 21. The purpose of the different size gears on the thermostats is to align all thermostats at their "off" positions when dial 14 is on the "off" position; then to spread their settings proportionately as dial 14 is turned to higher temperature positions. By thus spreading the settings of the several valves in the normal operating ranges, fewer burners will be in use when the actual manifold temperature is close to the dialed temperature, and increasing groups of burners will be brought into use if the manifold temperatures continue to drop further from the dialed temperature. Faster turning gears 19 and 21 are linked to their shafts 22 and 20, respectively, only by springs, so that in a maximum demand situation, even the slowest turning gear 18 on he lowest temperature thermostat can be brought to its maximum temperature setting by overcoming the shaft spring pressure developed when the faster gears are turned beyond the maximum positions of their thermostats. This shaft spring pressure will tend to re-establish the normal spread of the settings when the maximum demand situation has passed and the tension has been removed from the linkages 15 and 16.

Each thermostatically-controlled valve supplies fuel to a plurality of burners spaced as equally as possible about the manifold. The flames from the burners impinge upon the outside of the manifold walls. Valve 25 supplies fuel through tube 30 to burners 31, 34, 37, 41, 44, 47 and 50. These same burners are simultaneously supplied with air through duct 70 from blower 73. Valve 26 supplies fuel through tube 29 to burners 32, 35, 38, 39, 42, 45 and 48. These same burners are simultaneously supplied with air through duct 69 from blower 72. Valve 27 supplies fuel through tube 28 to burners 33, 36, 40, 43, 46, 49 and 51. These same burners are simultaneously supplied with air through duct 68 from blower 71. The duct work is cut away from the drawing in the burner area of FIG. 2 for clarity, but the ducts feed the air directly into the proper burners.

Pilot valve 64 has a control 65 which allows fuel to be supplied through tube 66 to a pilot burner (not shown) adjacent to the main burners. If the pilot burner should be accidentally extinguished, its own temperature sensor (not shown) through tube 67 causes the fuel to be cut off for safety.

As noted previously, the burner area about the manifold is completely enclosed by removable jacket panels 60 (some are removed in FIG. 2) to which insulation panels 59 are affixed. Only close-fitting pipe, tube, duct and conductor passages are provided, plus a duct connection at 52 for a hot-gas exhaust duct. The enclosed burner area will be slightly pressurized from operation, and the relatively small area of the exhaust and blower ducts and the resultant velocity of the exhaust gas and air moving through the ducts should allow relatively safe operation of the manifold even in moderately fire hazardous locations. Each duct can be fitted with a butterfly valve (not shown) to further close off the burner area when the duct is not in use. Fuel is supplied to all fuel valves by tube 63 from a remote tank and pressure system (not shown).

Suitable gauges (not shown) can be located in the driver's compartment of a vehicle to show the actual temperature and pressure in the manifold. An automatic pressure-releasing safety valve (not shown) can also be provided.

Numerals 23 and 24 indicate rollers to support rack 17 into mesh with gears 18, 19 and 21. Numerals 74, 75 and 76 indicate tubes connected to temperature sensors (not shown) on the manifold, for control of their individual valves. Numerals 77, 78 and 79 indicate electrical conductors connected to a low-voltage power supply (not shown) and they are also connected individually from each valve to its corresponding blower through conductors 81, 82 and 83. Numeral 87 indicates the mounting plate upon which manual release assembly 86 is mounted and temperature control dial 14 is rotatably mounted.

It has thus been described a novel vapor generating device to be used in combination with a vapor engine to form a compact and composite structure. The vapor generating manifold is directly fastenable to engines, turbines, or the like, for the purpose of supplying heated vapor under pressure directly into them as their motive power. In operation, the manifold is quickly heated and its greatly heated walls are closely spaced so hat their heat transfer surfaces are relatively large compared to the small volume or space between them.

What is claimed is:

1. The combination of a vapor generating manifold and vapor engine comprising:
    a vapor-driven engine,
    a manifold mounted on said engine for delivering vaporized working fluid thereto,
    said manifold being so constructed and arranged so as to be mounted on said engine to form a substantially composite and unitary structure;
    fluid conduit means delivering working fluid in a liquid state to said manifold,
    said manifold including a narrow arc-shaped passageway bounded by substantially semicircular walls,
    an inlet means whereby fluid in said fluid conduit means is delivered to said passageway;
    burners on the outer sides of said semicircular walls, said burners being mounted within the vapor manifold,
    said burners providing a means for adding energy to the liquid working fluid whereby the liquid working fluid delivered to said passageway is vaporized;
    outlet means at one end of said passageway in intimate engagement with an inlet means on said engine,
    whereby fluid vaporized in said passageway may be delivered to said engine for expansion ad production of work;
    a condenser,
    fluid conduit means for delivering expanded exhaust vapors from said engine to said condenser, fluid conduit means for delivering fluid condensed in said condenser back to the vapor generating manifold whereby a closed cycle is formed.

* * * * *